United States Patent
Mao et al.

(10) Patent No.: US 8,704,980 B2
(45) Date of Patent: Apr. 22, 2014

(54) BLUE PHASE LIQUID CRYSTAL DISPLAY PANEL AND LIQUID CRYSTAL DISPLAY

(75) Inventors: Lianbo Mao, KunShan (CN); Wenjun Dai, KunShan (CN); Xiaoliang Zhu, KunShan (CN); Yaru Fan, KunShan (CN)

(73) Assignee: Infovision Optoelectronics (Kunshan) Co. Ltd., Kunshan (CN)

( * ) Notice: Subject to any disclaimer, the term of this patent is extended or adjusted under 35 U.S.C. 154(b) by 476 days.

(21) Appl. No.: 13/039,773

(22) Filed: Mar. 3, 2011

(65) Prior Publication Data
US 2012/0105751 A1    May 3, 2012

(30) Foreign Application Priority Data
Nov. 2, 2010   (CN) .......................... 2010 1 0528976

(51) Int. Cl.
*G02F 1/1335*   (2006.01)
*G02F 1/133*    (2006.01)
*C09K 19/02*    (2006.01)

(52) U.S. Cl.
USPC ............. 349/113; 349/33; 349/114; 349/168; 349/169

(58) Field of Classification Search
CPC ................. G02F 2001/13793; C09K 19/0275
USPC ........................... 349/113, 114, 33, 168, 169
See application file for complete search history.

(56) References Cited

U.S. PATENT DOCUMENTS

| | | | |
|---|---|---|---|
| 4,701,028 A * | 10/1987 | Clerc et al. | 349/98 |
| 6,727,965 B1 * | 4/2004 | Kubota | 349/113 |
| 2010/0091228 A1 * | 4/2010 | Kim et al. | 349/122 |

* cited by examiner

*Primary Examiner* — Michael Caley
*Assistant Examiner* — Paisley L Arendt
(74) *Attorney, Agent, or Firm* — Staas & Halsey LLP

(57) ABSTRACT

A display panel comprises a first and a second substrates and a BP liquid crystal layer. A first electrode is provided on the first substrate, a second electrode is provided on the second substrate, and reflection portions each having a first and a second reflection surfaces are provided between the first and second substrates. When light is transmitted to the panel, the light is reflected on the first reflection surface of the reflection portion and the light after the first reflection is transmitted to an adjacent reflection portion through the liquid crystal layer and is reflected on the second reflection surface of the adjacent reflection portion. When different voltages are applied, the liquid crystal layer will shift the phase position of the light passing therethrough, while when there is no voltage, the liquid crystal layer will not shift the phase position of the light passing therethrough.

15 Claims, 3 Drawing Sheets

BLUE PHASE LIQUID CRYSTAL DISPLAY PANEL AND LIQUID CRYSTAL DISPLAY

CROSS-REFERENCE TO RELATED APPLICATION

This application claims priority of and incorporates by reference Chinese Patent Application No. 201010528976.8 filed Nov. 2, 2010.

FIELD OF THE INVENTION

The present invention relates to the field of liquid crystal display, and particularly to a blue phase liquid crystal display panel and a liquid crystal display having the same.

BACKGROUND

A liquid crystal display panel is a key component for a liquid crystal display. Generally, the liquid crystal display panel is formed by adhering a sheet of thin film transistor (TFT) array substrate to a sheet of color filter (CF) substrate and then dropping in liquid crystals between the two substrates.

A blue phase (BP) liquid crystal is a phase state having special characteristics in liquid crystals. The blue phase liquid crystal can transform isotropic refractive index into anisotropic refractive index in accordance with the voltage applied, and the liquid crystal display panel employing the blue phase liquid crystals can substantially improve its response speed without alignment process.

The conventional liquid crystal display panel employing the blue phase liquid crystals is still limited to the use of transverse electric field, i.e. the two electrodes generating the transverse electric field are formed on the same substrate of the liquid crystal display panel since the current blue phase liquid crystals are all positive liquid crystals. For example, with respect to an In-Plane Switching (IPS) type blue phase liquid crystal display panel, the blue phase liquid crystals are activated in the direction parallel to the plane where the substrate is located.

FIGS. 1 and 2 disclose a conventional IPS type blue phase liquid crystal panel. As shown in FIGS. 1 and 2, the conventional IPS type blue phase liquid crystal panel 200 comprises an array substrate 21, an opposite substrate 22 and a blue phase liquid crystal layer consisting of blue phase liquid crystals 23 sandwiched between the array substrate 21 and the opposite substrate 22. Pixel electrodes 211 and common electrodes 212 are alternately arranged on the array substrate 21. A lower polarizer 25 is provided on one side of the array substrate 21 far away from the blue phase liquid crystal layer and an upper polarizer 26 is provided on one side of the opposite substrate 22 far away from the blue phase liquid crystal layer, and moreover, the absorption axes of the lower polarizer 25 and the upper polarizer 26 are orthogonal.

FIG. 1 is a partially sectional schematic view of the conventional IPS type blue phase liquid crystal display panel in OFF state. As shown in FIG. 1, there is no voltage between the pixel electrode 211 and the common electrode 212 located on the array substrate 21 and further no transverse electric filed is generated therebetween when the IPS type blue phase liquid crystal display panel is in OFF state, and therefore the blue phase liquid crystals 23 remain spheroidal in OFF state. When light emitted from a backlight source (not shown) enters from the side of the array substrate 21 on the IPS type blue phase liquid crystal display panel 200, after passing through the lower polarizer 25, only the light whose polarization state is perpendicular to the absorption axis of the lower polarizer 25 can pass through, and because the spheroidal blue phase liquid crystals 23 at this time maintain isotropic refractive index, the light will not shift its polarization state after passing through the blue phase liquid crystals 23, and is then transmitted to the upper polarizer 26 through the opposite substrate 22. Since the absorption axes of the lower polarizer 25 and the upper polarizer 26 are orthogonally configured, the light after passing through the upper polarizer 26 is fully absorbed, and no light may pass through the IPS type blue phase liquid crystal display panel 200. Transmittance of the IPS type blue phase liquid crystal display panel 200 is zero, thus presenting dark state.

FIG. 2 is a partially sectional schematic view of the conventional IPS type blue phase liquid crystal display panel 200 in ON state. As shown in FIG. 2, the pixel electrode 211 and the common electrode 212 which are located on the array substrate 21 are applied with different voltages respectively when the IPS type blue phase liquid crystal display panel 200 is in ON state, and therefore a transverse electric field E is generated between the pixel electrode 211 and the common electrode 212. At this time, the blue phase liquid crystals 23 located in the transverse electric field E will be "horizontally stretched" along the direction of electric field line under action of the transverse electric field E from original spheroidal shape to ellipsoidal shape, and transformed from isotropic refractive index to anisotropic refractive index. When the light whose polarization state is perpendicular to the absorption axis of the lower polarizer 25 passes through the blue phase liquid crystals 23, the light passing the blue phase liquid crystals 23 is twisted to shift its polarization state since the blue phase liquid crystals 23 at this time maintain anisotropic to refractive index, allowing the light passing through the blue phase liquid crystals 23 not to be perpendicular to the absorption axis of the upper polarizer 26, thus the light may transmit through the upper polarizer 26, and pass through the IPS type blue phase liquid crystal display panel 200. Transmittance of the IPS type blue phase liquid crystal display panel 200 is not zero, thus presenting bright state. It is possible to control light transmittance by the voltages applied to the pixel electrode 211 and the common electrode 212 since the refractive index of the blue phase liquid crystals 23 is dependent on the electric field applied thereto, thus realizing presentation of respective gray scales for the IPS type blue phase liquid crystal display panel 200.

However, since the transverse electric field E has an impact only on the blue phase liquid crystals 23 around the pixel electrode 211 and the common electrode 212, transmittance of the blue phase liquid crystal display panel 200 is relatively lower and the electric field generated is relatively weaker, a relatively larger driving voltage is generally required for the blue phase liquid crystal display panel 200 employing this transverse electric field E.

The reason why the vertical electric field is not suitable for the current liquid crystal display panel employing the blue phase liquid crystals is that the blue phase liquid crystals will be "stretched" in the vertical direction under action of the vertical electric field generated between the pixel electrode on the array substrate of the liquid crystal display panel and the common electrode on the opposite substrate after voltage is applied to the liquid crystal display panel, and there is no shift in phase position for the polarized light passing through the blue phase liquid crystals stretched in the vertical direction, with the polarization state of the polarized light passing through the blue phase liquid crystals being the same with that when no voltage is applied to the blue phase liquid crystal display panel, furthermore, the light emitted from the backlight source cannot pass through the liquid crystal display panel since the absorption axes of the upper and lower polarizers on the liquid crystal display panel are orthogonal, so that it is impossible to acquire the bright state for the liquid crystal display panel and therefore it cannot be realized for presentation of respective gray scales for the blue phase liquid crystal display panel only by such the vertical electric field.

SUMMARY

The present invention provides a blue phase liquid crystal display panel and a liquid crystal display to decrease the driving voltage on the liquid crystal display panel.

One aspect of the present invention provides a blue phase liquid crystal display panel comprising a first substrate, a second substrate and a blue phase liquid crystal layer disposed between the first substrate and the second substrate. A first electrode is provided on the first substrate, a second electrode is provided on the second substrate, and a plurality of reflection portions are provided between the first substrate and the second substrate, each reflection portion having a first reflection surface and a second reflection surface. When light emitted from a backlight source is transmitted to the liquid crystal display panel, the light is at least reflected on the first reflection surface of one reflection portion for the first time and the light after the first reflection is transmitted to an adjacent reflection portion through the blue phase liquid crystal layer and is reflected on the second reflection surface of the adjacent reflection portion for the second time. When different voltages are applied to the first electrode and the second electrode, a vertical electric field is generated therebetween and the blue phase liquid crystal layer will shift the phase position of the light passing therethrough, while when there is no voltage between the first electrode and the second electrode, the blue phase liquid crystal layer will not shift the phase position of the light passing therethrough.

Another aspect of the present invention provides a liquid crystal display, comprising the blue phase liquid crystal display panel as described above and a backlight source used for emitting the light to the blue phase liquid crystal display panel.

The blue phase liquid crystal display panel and the liquid crystal display of the present invention can successfully change the path in which the light is transmitted in the blue phase liquid crystal layer by changing the structural design of the conventional liquid crystal display panel and providing a plurality of reflection portions between the first substrate and the second substrate, thus allowing the blue phase liquid crystal layer to shift the phase position of the light to realize the display of image when voltages are applied to the first electrode provided on the first substrate of the blue phase liquid crystal display and the second electrode provided on the second substrate. Therefore, compared to the conventional blue phase liquid crystal display panel employing the transverse electric field, the blue phase liquid crystal display panel employing the vertical electric field according to the present invention can largely reduce the driving voltage and decrease energy consumption.

Other aspects and features of the present invention will become apparent from the detailed description of accompanying drawings. But it should be known that the accompanying drawings are only designed for the purpose of explanation but not for limitation of the scope of the present invention which should be referred to the appended claims. Also, it should be known that the accompanying drawings are not necessarily drawn to scale, which only attempt to conceptually explain the structure and flow described herein.

BRIEF DESCRIPTION OF THE DRAWINGS

The detailed description will be made to the particular embodiments of the present invention in combination with the accompanying drawings below.

DETAILED DESCRIPTION OF THE EMBODIMENTS

To make the above objects, features and advantages of the present invention more apparent, a detailed description will be given to the particular embodiments of the present invention in combination with the drawings hereinafter.

It should be understood that, for clarity, the accompanying drawings of the present invention only disclose the structural features closely related to the inventive aspects but omit other structural features.

A liquid crystal display of the present invention comprises a blue phase liquid crystal display panel 100 and a backlight source (not shown) used for emitting light to the blue phase liquid crystal display panel 100.

Figure 1:
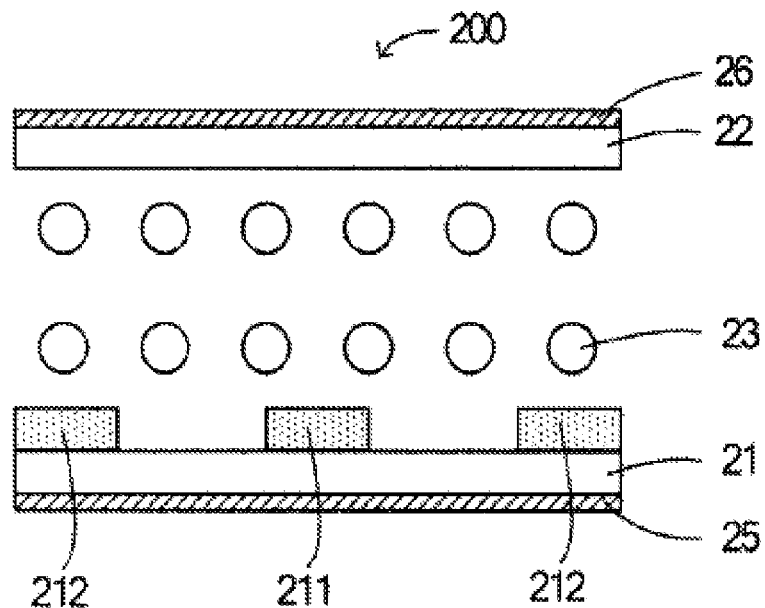
FIG. 1 is a partially sectional schematic view of a conventional IPS type blue phase liquid crystal display panel in OFF state.
Figure 2:
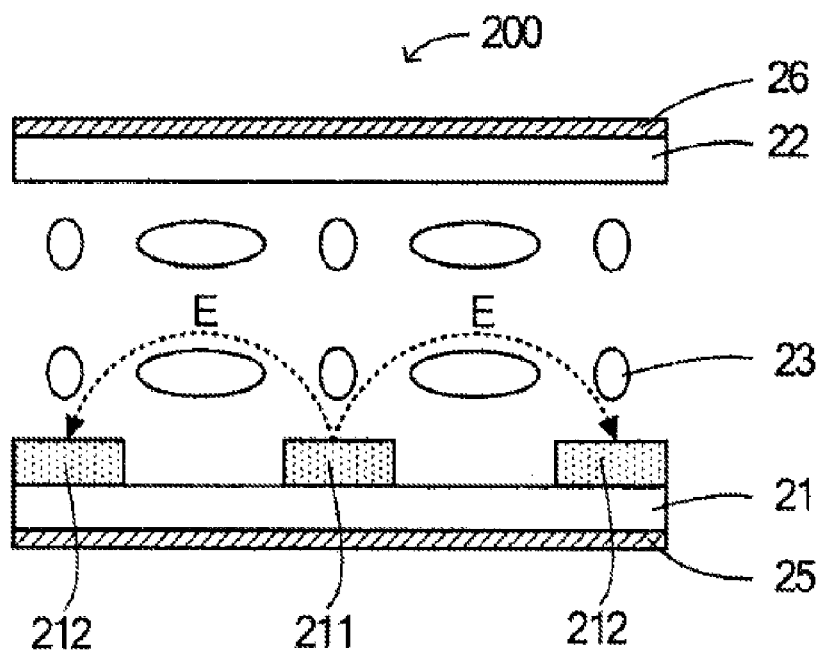
FIG. 2 is a partially sectional schematic view of the conventional IPS type blue phase liquid crystal display panel in ON state.
Figure 3:
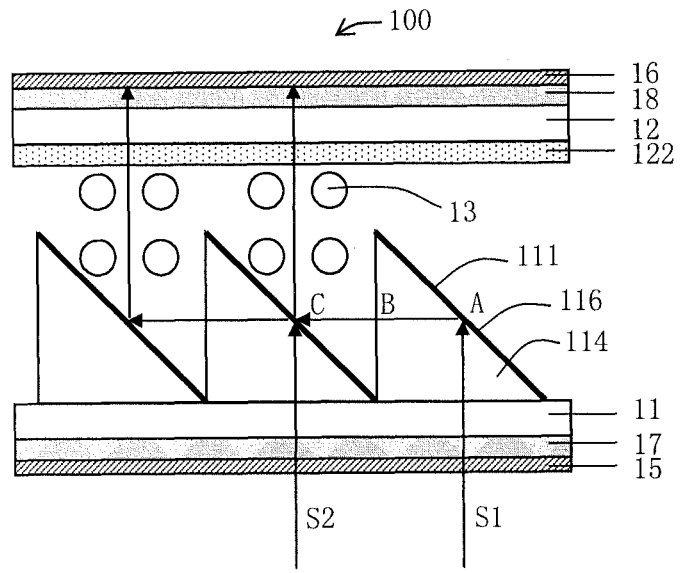
FIG. 3 is a partially sectional schematic view of a blue phase liquid crystal display panel according to one embodiment of the present invention in OFF state.
Figure 4:
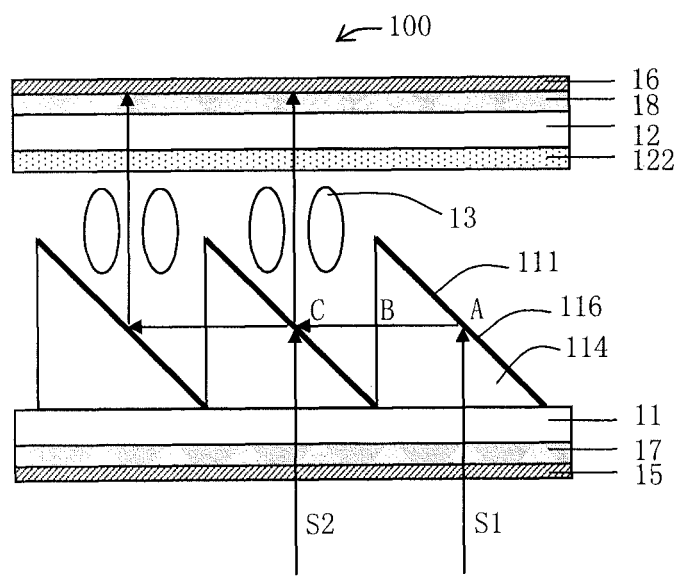
FIG. 4 is a partially sectional schematic view of the blue phase liquid crystal display panel according to one embodiment of the present invention in ON state.

FIGS. 3 and 4 disclose a blue phase liquid crystal display panel according to one embodiment of the present invention. As shown in FIGS. 3 and 4, the blue phase liquid crystal display panel 100 of the present invention comprises an array substrate 11, an opposite substrate 12 and a blue phase liquid crystal layer consisting of blue phase liquid crystals 13 sandwiched between the array substrate 11 and the opposite substrate 12. A lower polarizer 15 is provided on one side of the array substrate 11 far away from the blue phase liquid crystal layer, and an upper polarizer 16 is provided on one side of the opposite substrate 12 far away from the blue phase liquid crystal layer, and moreover, the absorption axes of the lower polarizer 15 and the upper polarizer 16 are parallel to each other. A lower quarter-wave plate 17 is provided between the blue phase liquid crystal layer and the lower polarizer 15, and an upper quarter-wave plate 18 is provided between the blue phase liquid crystal layer and the upper polarizer 16. In this particular embodiment, the lower quarter-wave plate 17 is provided between the array substrate 11 and the lower polarizer 15, and the upper quarter-wave plate 18 is provided between the opposite substrate 12 and the upper polarizer 16.

The blue phase liquid crystal display panel 100 comprises a plurality of pixel units, each pixel unit comprising a pixel electrode 111 provided on the array substrate 11 and a common electrode 122 provided on the opposite substrate 12.

A plurality of transparent protrusions 114 are formed on the array substrate 11. Each pixel unit comprises a plurality of strip-like arranged transparent protrusions 114. Preferably, the plurality of transparent protrusions 114 have the same structure. In this particular embodiment, the section of the transparent protrusion 114 is isosceles right triangle with one of the right-angle sides thereof parallel to the plane where the array substrate 11 is located, and another of the right-angle sides perpendicular to the plane where the array substrate 11 is located. A reflection portion 116 having a first reflection surface and a second reflection surface is formed on the hypotenuse of the isosceles right triangle. Preferably, the first and second reflection surfaces are essentially parallel and opposite surfaces. In this embodiment, the reflection portion 116 and the pixel electrode 111 are integrally provided, with the reflection portion 116 serving as the pixel electrode 111 at the same time and the first reflection surface and the second reflection surface of the reflection portion 116 being the two opposite surfaces of the pixel electrode 111. The plurality of reflection portions 116 formed on the plurality of transparent protrusions 114 of each pixel unit are in essentially parallel arranged strips, that is to say, a plurality of strip-like and substantially parallel arranged pixel electrodes 111 are formed in each pixel unit and the pixel electrodes 111 provided on the plurality of transparent protrusions 114 in each pixel unit are electrically connected to each other. The plurality of transparent protrusions 114 in the same pixel unit are arranged adjacent to each other, allowing the projections of the plurality of reflection portions 116 in the same pixel unit on the plane where the array substrate 11 is located are adjacent to each other, thus ensuring the controllability for the light passing through each pixel unit and the possibility for transmittance of most of the light, so as to increase the utilization of backlight.

The pixel electrode 111 can be made of conductive metal material such as aluminum, molybdenum, copper and etc., and there is a preferable specular reflection on the upper and lower surfaces of the pixel electrode 111. The common electrode 122 is made of transparent conductive material such as ITO (Indium Tin Oxide) or IZO (Indium Zinc Oxide), etc.

The array substrate 11 also comprises a plurality of scanning lines (not shown), a plurality of data lines (not shown) substantially perpendicular to and intersecting with the plurality of scanning lines and a plurality of thin film transistors (not shown) near the region where the plurality of scanning lines intersect with the plurality of data lines. The thin film transistors are used for controlling the pixel electrodes 111, and the gate electrode of each thin film transistor is connected to the corresponding scanning line, the source electrode thereof is connected to the corresponding data line, and the drain electrode thereof is connected to the corresponding pixel electrode 111.

When different voltages are applied to the pixel electrode 111 on the array substrate 11 and the common electrode 122 on the opposite substrate 12, a vertical electric field perpendicular to the plane where the array substrate 11 and/or the opposite substrate 12 are located may be generated between the pixel electrode 111 and the common electrode 122. The "vertical electric field" mentioned in the present invention indicates that the two electrodes generating the vertical electric field are respectively formed on different substrates of the blue phase liquid crystal display panel 100.

FIG. 3 is a partially sectional schematic view of the blue phase liquid crystal display panel 100 according to the present invention in OFF state. As shown in FIG. 3, when the backlight source is on and the blue phase liquid crystal display panel 100 is in OFF state, the light emitted from the backlight source is vertically transmitted to the blue phase liquid crystal display panel 100. Taking one light beam S1 for instance, when a natural light beam S1 passes through the lower polarizer 15, only the linearly polarized light whose polarization direction is perpendicular to the absorption axis of the lower polarizer 15 can pass through, given the polarization state of linearly polarized light at this time is 0 degree. Later the light is transmitted through the lower quarter-wave plate 17, the phase position of the linearly polarized light is shifted by $\pi/2$ into left circularly polarized light, and later the light is transmitted to a point A on the lower surface of the pixel electrode 111 through the transparent array substrate 11 and the transparent protrusion 114, and is reflected at the point A on the lower surface of the pixel electrode 111 for the first time, and the phase position of the light beam S1 after the first reflection at the point A is shifted by $\pi$ into right circularly polarized light, and the light beam S1 after the first reflection at the point A is transmitted to a boundary point B of the transparent protrusion 114 along the direction essentially parallel to the plane where the array substrate 11 is located. During the transmission of the light beam S1 in the transparent protrusion 114, there is no shift in the polarization state of the light beam S1, and later the light beam S1 enters the blue phase liquid crystals 13 along the direction essentially parallel to the plane where the array substrate 11 is located, and the light beam S1 is transmitted from the point B to a point C on the upper surface of the adjacent pixel electrode 111. During the transmission of the light beam S1 from the point B to the point C, there is no voltage between the pixel electrode 111 and the common electrode 122 and further no vertical electric field is generated therebetween since the blue phase liquid crystal display panel 100 is in OFF state, and at this time, the blue phase liquid crystals 13 maintain the isotropic refractive index, and therefore, the blue phase liquid crystals 13 will not shift the phase position of the light beam S1 passing therethrough, i.e. the polarization state of the light beam S1 remains the same during its transmission in the blue phase liquid crystals 13, and later the light beam S1 is reflected at the point C on the upper surface of the adjacent pixel electrode 111 for the second time, and the phase position of the light beam S1 after the second reflection at the point C is shifted by $\pi$ into left circularly polarized light, and later the light beam S1 is transmitted through the transparent common electrode 122 and the transparent opposite substrate 12, and then through the upper quarter-wave plate 18, the phase position of the light beam S1 is shifted by $\pi/2$ into linearly polarized light at which time there is a difference of $\pi$ between the phase position of the linearly polarized light and that of the linearly polarized light passing through the lower polarizer 15, i.e. the polarization state of linearly polarized light at this time is 90 degrees, and the light beam S1 cannot pass through the blue phase liquid crystal display panel 100 since the absorption axes of the lower polarizer 15 and the upper polarizer 16 are parallel to each other, and the light emitted from the backlight source cannot be transmitted through the blue phase liquid crystal display panel 100 at this time, and the blue phase liquid crystal display panel 100 presents dark state. The light beam S2 in FIG. 3 has a path similar to the light beam S1, which therefore will not be described herein.

FIG. 4 is a partially sectional schematic view of the blue phase liquid crystal display panel 100 according to the present invention in ON state. Still taking the light beam S1 for instance, the transmission of the light beam S1 before the point B is the same with the above in OFF state shown in FIG. 3. During the transmission of the light beam S1 from the point B to the point C, different voltages are applied to the pixel electrode 111 and the common electrode 122 and a vertical electric field is generated therebetween since the blue phase liquid crystal display panel 100 is in ON state, and at this time, the blue phase liquid crystals 13 maintain the anisotropic characteristic, and when the light beam S1 passes through the blue phase liquid crystals 13 along the direction essentially parallel to the plane where the array substrate 11 is located, the blue phase liquid crystals 13 will shift the phase position of the light beam S1 passing therethrough, i.e. the polarization state of the light beam S1 will be shifted during its transmission in the blue phase liquid crystals 13.

When the anisotropy constant Δn of the blue phase liquid crystals 13, the distance d of the light passing through the blue phase liquid crystals 13 (i.e. the distance between the point B and the point C) and the wavelength λ of the incident light satisfy Δnd=λ/2, the phase position will be shifted by π into left circularly polarized light as the light beam S1 is transmitted from the point B as right circularly polarized light to the point C through the blue phase liquid crystals 13 by shifting the polarization state of the light under action of the anisotropy of the blue phase liquid crystals 13. After the second reflection of the light beam S1 at the point C on the upper surface of the adjacent pixel electrode 111, the phase position of the light beam S1 is shifted by π into right circularly polarized light, and then the light beam S1 is sequentially transmitted through the transparent common electrode 122, the transparent opposite electrode 12 and the upper quarter-wave plate 18. The phase position is further shifted by π/2 into linearly polarized light when the light beam S1 passes through the upper quarter-wave plate 18, and at this time, there is a difference of 0 between the phase position of the linearly polarized light and that of the linearly polarized light passing through the lower polarizer 15, i.e. the polarization state of the linearly polarized light at this time is still 0 degree. The light beam S1 can be fully transmitted through the blue phase liquid crystal display panel 100 since the absorption axes of the lower polarizer 15 and the upper polarizer 16 are parallel to each other. The light beam S2 in FIG. 4 has a path similar to the light beam S1, which therefore will not be described herein.

The relation between the anisotropy constant Δn of the blue phase liquid crystals 13 and the electric field intensity E applied is as follows:

$$\Delta n = \lambda K E^2$$

Wherein λ is the wavelength of the incident light, and K is the Kerr constant of the blue phase liquid crystals 13. The electric field intensity E of the blue phase liquid crystal layer between the pixel electrode 111 and the common electrode 122 is adjusted by altering the voltage therebetween, so as to alter the anisotropy constant Δn of the blue phase liquid crystals 13, allowing the light passing through the blue phase liquid crystals 13 (from the point B to the point C) to be shifted into a different elliptical polarized light, and the light can be partially emitted from the upper polarizer 16, so as to present respective gray scales of the blue phase liquid crystal display panel 100.

Preferably, the voltages applied to the pixel electrode 111 and the common electrode 122 allow the light reflected from the region near the middle hypotenuse of the isosceles right triangle, i.e. the light reflected from the central region of the pixel electrode 111 to be completely transmitted through the lower polarizer 15 and the upper polarizer 16. At this time, for the other light from the light that is transmitted to the blue phase liquid crystal display panel 100 but not transmitted to the central region of the pixel electrode 111, it will not satisfy Δnd=λ/2 since the distance d of the light passing through the blue phase liquid crystals 13 along the direction essentially parallel to the plane where the array substrate 11 is located is different from the light incident to the central region of the pixel electrode 111, and the light can be only partially transmitted through the blue phase liquid crystal display panel 100. For a strip-like pixel electrode 111, the light reflected therefrom is emitted from the blue phase liquid crystal display panel 100, with the highest brightness corresponding to the central region of the strip-like pixel electrode 111, and decreasing brightness corresponding to two sides of the strip-like pixel electrode 111. As each pixel unit comprises a plurality of such strip-like pixel electrodes 111, when the light incident to the central region of the pixel electrode 111 satisfies Δnd=λ/2, the mean brightness for the whole pixel unit reaches the maximal, and at this time the blue phase liquid crystal display panel 100 presents bright state.

In addition to isosceles right triangular section, the transparent protrusions 114 of the present invention have other ways of design if only it is a way to vary the shape of the transparent protrusions 114 to allow the light to pass through the blue phase liquid crystal layer along the direction essentially parallel to the plane where the array substrate 11 is located, which all fall within the structural modifications of the transparent protrusions 114 of the present invention. Moreover, the object of the present invention can be realized if only the light reflected for the first time by the pixel electrode 111 has a component along the direction essentially parallel to the plane where the array substrate 11 is located.

Color filters can be provided on the opposite substrate 12. Certainly, as the blue phase liquid crystals 13 have characteristic of rapid response, there is no need to provide the color filters on the opposite substrate 12 if the blue phase liquid crystal display panel 100 is activated by the field sequential color backlight source, thus largely reducing the cost, simplifying the process and meanwhile increasing the utilization of backlight.

The above mentioned is only one of the embodiments of the present invention. Certainly, the reflection portions 116 and the pixel electrodes 111 of the present invention can also be separately provided on the transparent protrusions 114. For example, the pixel electrode 111 can be formed on the first reflection surface of the reflection portion 116, or the pixel electrode 111 can be also formed on the second reflection surface of the reflection portion 116. In this case, the pixel electrode 111 can still be made of transparent conductive material, and the reflection portion 116 is made of non-conductive reflective material. Also, the object of the present invention can be realized.

Figure 5:
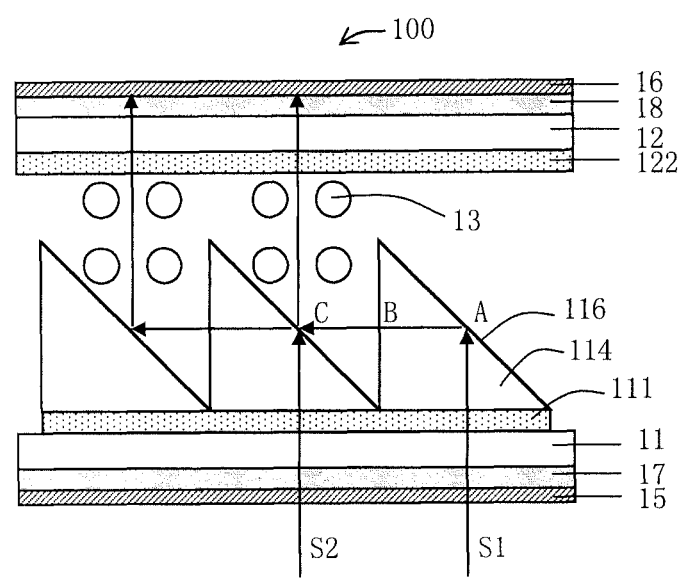
FIG. 5 is a partially sectional schematic view of a blue phase liquid crystal display panel according to another embodiment of the present invention in OFF state.

FIG. 5 is a partially sectional schematic view of a blue phase liquid crystal display panel according to another embodiment of the present invention in OFF state. What is common between the blue phase liquid crystal display panel 100 shown in FIG. 5 and that shown in FIG. 3 will not be described, but the difference therebetween is that the reflection portions 116 and the pixel electrodes 111 are separately provided, and the pixel electrode 111 and the common electrode 122 are substantially in parallel provided in the blue phase liquid crystal display panel 100 shown in FIG. 5, and moreover, transparent protrusions 114 are provided on one side of the pixel electrode 111 near the blue phase liquid crystal layer, and reflection portions 116 are provided on the transparent protrusions 114. In this case, the pixel electrode 111 can still be made of transparent conductive material, and the reflection portion 116 is made of non-conductive reflective material. The pixel electrode 111 can be provided integrally in each pixel unit for this blue phase liquid crystal display panel shown in FIG. 5, and it is only needed to form structures of the transparent protrusions 114 and the reflection portions 116 on the conventional array substrate generally without changing the pixel structure of the conventional liquid crystal display panel. Therefore, the process for the blue phase liquid crystal display panel 100 shown in FIG. 5 is more easily realized compared to FIG. 3 besides the advantageous effects shown in FIG. 3.

Moreover, the transparent protrusions 114 and the reflection portions 116 of the present invention can be inversely provided on the array substrate 11 and the opposite substrate 12, i.e. the transparent protrusions 114 and the reflection portions 116 are provided on the opposite substrate 12. In the embodiment that both the transparent protrusions 114 and the reflection portions 116 are provided on the opposite substrate 12, in the same manner, the reflection portion 116 and the common electrode 122 can be integrally provided, i.e. the reflection portion 116 serves as the common electrode 122 at the same time, or the reflection portion 116 and the common electrode 122 may be separately provided on the transparent protrusion 114, and the common electrode 122 may be provided on the first or the second reflection surface of the reflection portion 116, or the reflection portions 116 and the common electrode 122 are separately provided, the common electrode 122 and the pixel electrode 111 are substantially in parallel provided, and transparent protrusions 114 are provided on one side of the common electrode 122 near the blue phase liquid crystal layer, and reflection portions 116 are provided on the transparent protrusions 114. These structures all are equivalents of the present invention, all of which can realize the object of the invention.

Moreover, in the present invention, the reflection portions 116 can even be provided both on the array substrate 11 and the opposite substrate 12. When the light is transmitted to the blue phase liquid crystal display panel 100, the light is reflected on the reflection surface of the reflection portion 116 on the array substrate 11 for the first time, and the light after the first reflection is transmitted to the adjacent reflection portions 116 on the opposite substrate 12 through the blue phase liquid crystal layer and is reflected on the reflection surface of the adjacent reflection portion 116 on the opposite substrate 12 for the second time.

From the above, if only the modifications of structural design meet the following conditions that a first electrode is provided on one of the substrates in the blue phase liquid crystal display panel (referred to as a first substrate) and a second electrode is provided on the other substrate (referred to as a second substrate) and a plurality of reflection portions are provided between the first substrate and the second substrate, when transmitted to the blue phase liquid crystal display panel, the light is reflected on the first reflection surface of the reflection portion for the first time, and the light after the first reflection is transmitted to the adjacent reflection portion through the blue phase liquid crystal layer and is reflected on the second reflection surface of the adjacent reflection portion for the second time, when different voltages are applied to the first and second electrodes, a vertical electric field is generated therebetween and the blue phase liquid crystal layer will shift the phase position of the light passing therethrough, while when there is no voltage between the first electrode and the second electrode, the blue phase liquid crystal layer will not shift the phase position of the light passing therethrough, which will not depart from the spirit of the present invention and fall within the scope of the present invention.

The first substrate can be the array substrate 11, and correspondingly, the first electrode should be the pixel electrode 111, the second substrate should be the opposite substrate 12, and the second electrode should be the common electrode 122, or, the first substrate can be the opposite substrate 12, and correspondingly, the first electrode should be the common electrode 122, the second substrate should be the array substrate 11, and the second electrode should be the pixel electrode 111.

The lower polarizer 15 of the present invention can be referred to as the first or second polarizer, and correspondingly, the upper polarizer 16 should be referred to as the second or first polarizer. The lower quarter-wave plate 17 of the present invention can be referred to as the first or second quarter-wave plate, and correspondingly, the upper quarter-wave plate 18 should be referred to as the second or first quarter-wave plate. In the same manner, the first or second polarizer and the first or second quarter-wave plate in the present invention can also be replaced by other materials that can achieve similar optical functions.

A plurality of reflection portions are provided between the first substrate and the second substrate by changing the conventional structural design for the blue phase liquid crystal display panel of the present invention, so as to change the path where the light is transmitted in the blue phase liquid crystal layer, allowing the blue phase liquid crystal layer to be able to shift the position phase of the light transmitted along the partial direction, and further to realize the presentation of respective gray scales for the blue phase liquid crystal display panel of the present invention when different voltages are applied to the first electrode and the second electrode. Therefore, the blue phase liquid crystal display panel of the present invention can employ the vertical electric field. The electric field intensity for the conventional blue phase liquid crystal display panel employing the transverse electric field is stronger only near the electrodes but weaker away from the electrodes, therefore, the transverse electric field only has a bigger impact on one side of the blue phase liquid crystals near the electrodes and a smaller impact on the side of the blue phase liquid crystals away from the electrodes, resulting in a higher driving voltage required to activate the whole blue phase liquid crystal layer, while the two electrodes generating the vertical electric field for the blue phase liquid crystal display panel employing the vertical electric field according to the present invention are respectively located on the two sides of the blue phase liquid crystal layer, and the vertical electric field not only has a bigger impact on the blue phase liquid crystals near the two electrodes but also on the blue phase liquid crystals in the region between the two electrodes. Therefore, the vertical electric field has a bigger impact on the blue phase liquid crystals in the entire blue phase liquid crystal layer, such that only a lower driving voltage is needed to generate an electric field sufficient strong to activate the blue phase liquid crystals in the electric field. Therefore, the blue phase liquid crystal display panel of the present invention can largely reduce its driving voltage and reduce energy consumption, compared to the conventional blue phase liquid crystal display panel employing the transverse electric field.

The blue phase liquid crystal display panel and the liquid crystal display provided in the present invention are described above in detail. Particular examples are presented herein to illustrate the principle and embodiments of the present invention, but the descriptions of the above embodiments are only used to help to understand the structure and concept of the present invention. Meanwhile, any possible variations and modifications are made for the one skilled in the art without departing from the spirit and scope of the present invention. In summary, the content of the specification should not be construed as limitation of the present invention, and the scope of the present invention should be referred to the scope defined by the attached claims.

What is claimed is:

1. A blue phase liquid crystal display panel, comprising:
a first substrate, a second substrate and a blue phase liquid crystal layer located between said first substrate and said second substrate;
a first electrode provided on said first substrate, a second electrode provided on said second substrate, and a plurality of reflection portions provided between said first substrate and said second substrate, each reflection portion having a first reflection surface and a second reflection surface; and
wherein when light emitted from a backlight source is transmitted to said blue phase liquid crystal display panel, the light is at least reflected on the first reflection surface of said reflection portion for a first time and the light after the first reflection is transmitted to an adjacent reflection portion through said blue phase liquid crystal layer and is reflected on the second reflection surface of said adjacent reflection portion for a second time,
when different voltages are applied to said first electrode and said second electrode, a vertical electric field is generated between said first electrode and said second electrode and said blue phase liquid crystal layer will shift a phase position of the light passing therethrough, and when there is no voltage between said first electrode and said second electrode, said blue phase liquid crystal layer will not shift the phase position of the light passing therethrough,
wherein a plurality of transparent protrusions are formed on said first substrate, and said reflection portion is provided on each transparent protrusion,
said blue phase liquid crystal display panel including a plurality of pixel units, each pixel unit including a plurality of strip-like arranged transparent protrusions, and said plurality of reflection portions are essentially in parallel arranged strips,
wherein projections of said plurality of reflection portions in a same pixel unit on a plane where said first substrate is located are adjacent to each other, thus ensuring controllability for the light passing through each pixel unit,
wherein the plurality of transparent protrusions have a same structure, and the plurality of transparent protrusions in the same pixel unit are arranged adjacent to each other, and
wherein a section of said transparent protrusion is an isosceles right triangle with one of the right-angle sides thereof parallel to the plane where said first substrate is located, and said reflection portion is formed on a hypotenuse of said isosceles right triangle.

2. The blue phase liquid crystal display panel of claim 1, wherein a first polarizer is provided on one side of said first substrate far away from the blue phase liquid crystal layer and a second polarizer is provided on one side of said second substrate far away from the blue phase liquid crystal layer, and a first quarter-wave plate is provided between said blue phase liquid crystal layer and said first polarizer, and a second quarter-wave plate is provided between said blue phase liquid crystal layer and said second polarizer.

3. The blue phase liquid crystal display panel of claim 2, wherein absorption axes of said first polarizer and said second polarizer are parallel to each other, and when different voltages are applied to said first electrode and said second electrode, at least part of the light is transmitted through both said first polarizer and said second polarizer, while when there is no voltage between said first electrode and said second electrode, the light cannot be transmitted through both said first polarizer and said second polarizer.

4. The blue phase liquid crystal display panel of claim 3, wherein said first reflection surface and said second reflection surface are essentially parallel and opposite surfaces, and voltage is applied to said first electrode and said second electrode, allowing the light reflected from a region near the middle of the hypotenuse of said isosceles right triangle to be completely transmitted through said first polarizer and said second polarizer.

5. The blue phase liquid crystal display panel of claim 1, wherein the light after the first reflection passes through said blue phase liquid crystal layer along a direction essentially parallel to the plane where said first substrate is located.

6. The blue phase liquid crystal display panel of claim 1, wherein said first electrode serves as said reflection portion, and said first reflection surface and said second reflection surface are two opposite surfaces of said first electrode.

7. The blue phase liquid crystal display panel of claim 6, wherein said first electrode is made of conductive metal material, and said second electrode is made of transparent conductive material.

8. The blue phase liquid crystal display panel of claim 1, wherein said first electrode and said second electrode are provided substantially in parallel, and said reflection portion is located on one side of said first electrode near said blue phase liquid crystal layer.

9. The blue phase liquid crystal display panel of claim 8, wherein said first electrode and said second electrode are both made of transparent conductive material, and said reflection portion is made of non-conductive reflective material.

10. The blue phase liquid crystal display panel of claim 1, wherein said first electrode is provided on the first reflection surface or second reflection surface of said reflection portion.

11. The blue phase liquid crystal display panel of claim 10, wherein said first electrode and said second electrode are both made of transparent conductive material, and said reflection portion is made of non-conductive reflective material.

12. The blue phase liquid crystal display panel of claim 1, wherein said first electrode is a pixel electrode, and said second electrode is a common electrode.

13. The blue phase liquid crystal display panel of claim 1, wherein said first electrode is a common electrode, and said second electrode is a pixel electrode.

14. A liquid crystal display comprising the blue phase liquid crystal display panel of claim 1 and the backlight source used for emitting said light to said blue phase liquid crystal display panel.

15. The liquid crystal display of claim 14, wherein a first polarizer is provided on one side of said first substrate far away from the blue phase liquid crystal layer and a second polarizer is provided on one side of said second substrate far away from the blue phase liquid crystal layer, and a first quarter-wave plate is provided between said blue phase liquid crystal layer and said first polarizer, and a second quarter-wave plate is provided between said blue phase liquid crystal layer and said second polarizer.

* * * * *